July 15, 1969 W. GANTER ET AL 3,456,137

TUNING FORK DEVICES

Filed June 7, 1966 2 Sheets-Sheet 1

INVENTORS
W. Ganter
BY F. Assmus
Watson, Cole, Grindle & Watson
Attys.

INVENTORS
W. Ganter
F. Assmus
BY
Watson, Cole, Grindle & Watson
Attys.

United States Patent Office 3,456,137
Patented July 15, 1969

3,456,137

TUNING FORK DEVICES

Wolfgang Ganter, Schramberg-Sulgen, and Friedrich Assmus, Schramberg, Germany, assignors to Messrs. Gebruder Junghans Gesellschaft mit beschrankter Haftung, Schramberg, Wurttemberg, Germany, a corporation of Germany Filed June 7, 1966, Ser. No. 555,766
Claims priority, application Germany, June 8, 1965, J 28,304
Int. Cl. H02k *33/10*
U.S. Cl. 310—25 1 Claim

ABSTRACT OF THE DISCLOSURE

A tuning fork device composed of ferro-magnetic material for timekeeping instruments having a permanent magnet arrangement with a closed magnetic path and coils capable of carrying out a relative motion against each other as a control coil and a drive coil. The tuning fork forms a part of a magnetic circuit of the permanent magnet.

Figure 1:
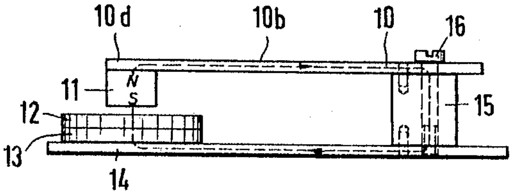

This invention relates to tuning fork devices that are maintained in oscillation by electromagnetic means as a speed regulating oscillator for timekeeping devices, with a permanent magnet arrangement with a large closed magnetic path and a coil arrangement capable of placing into effect, a reciprocal motion. The coil arrangement preferably consists of a control coil and a drive coil which lie in the input and output circuit of an electronic amplifier circuit, preferably a semiconductor amplifier circuit.

Tuning fork devices of the type referred to are known, and they are especially suitable as speed controls for small timepieces. The known tuning fork oscillators have a relatively large oscillating mass, whereby the dependence of the oscillation frequency on the position becomes relatively great. The basic object of the present invention is to create a tuning fork device which with a relatively small oscillating mass shows good efficiency and low position dependence in the frequency. A further object of the invention resides in the tuning fork device consisting of ferromagnetic material and forming at least a part of a magnetic yoke of the permanent magnet arrangement. In this case the permanent magnets are arranged at the ends of the tuning fork, the latter being preferably attached by its stem or by a part connection therewith composed of ferromagnetic material, to a base plate, likewise composed of ferromagnetic material, supporting the coil arrangement. The tuning fork can be attached by its stem or by a part connection therewith under interposition of a permanent magnet to a base plate composed of ferromagnetic material and supporting the coil arrangement. It is also possible to provide two tuning forks arranged on both sides of the coil arrangement, which tuning forks are connected with each other by their stems or by parts connected with the latter under interposition of a permanent magnet. Finally, a tuning fork can be provided of which one prong carries the coil arrangement and the other prong carrying the permanent magnet arrangement.

It is also possible with an arrangement of the type mentioned herein to provide a permanent magnet arrangement with a box-like magnetic yoke part into which the tuning fork prongs extend and which contains both the permanent magnet arrangement and the coil arrangement. Thereby a stationary magnetic yoke part can be provided in which the coils are arranged in planes parallel to the oscillation plane of the tuning fork at both sides of at least one tuning fork prong, which carries a permanent magnet that is magnetized at right angles to the plane of oscillation. But there can also be provided at least one stationary permanent magnet arrangement, which is likewise associated with a fixed box-like part, whereby the coil arrangement is attached to the tuning fork, which extends into the box of the magnet arrangement with the prong carrying the coil arrangement.

Figure 2:
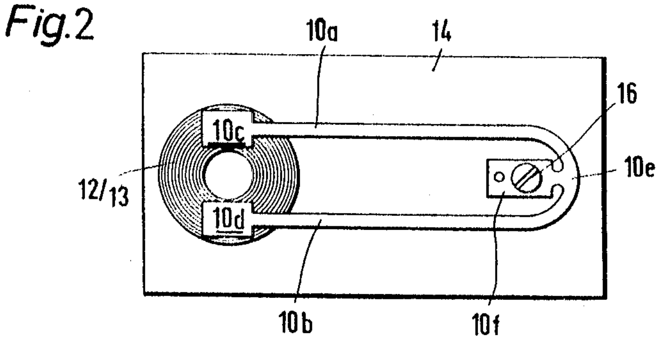
Figure 3:
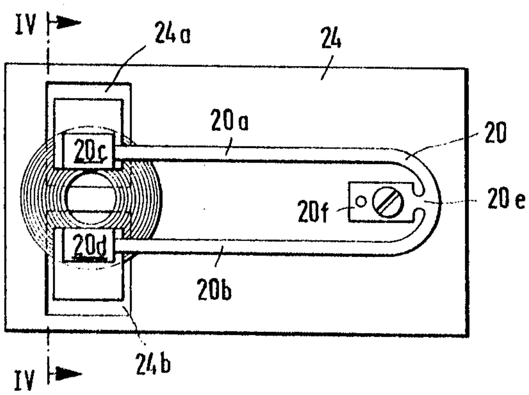
Figure 4:
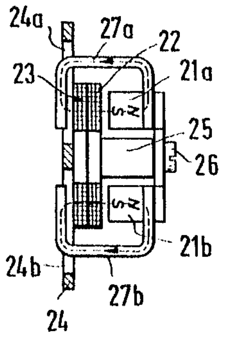
Figure 5:
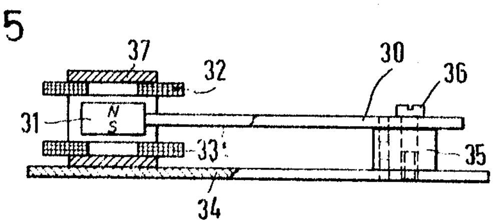
Figure 6:
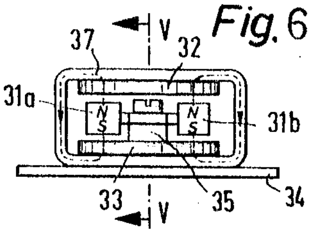
Figure 7:
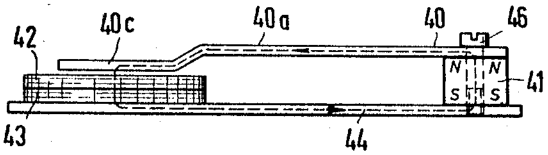
Figure 8:
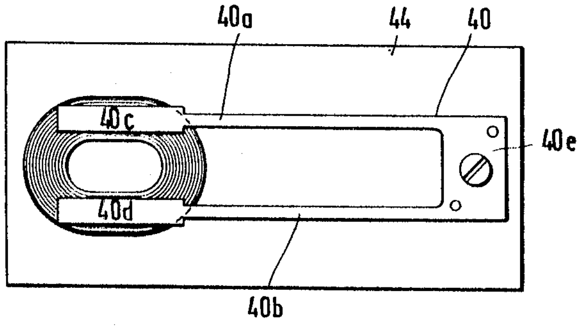
Figure 9:
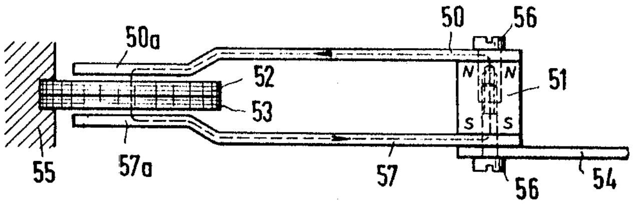
Figures 10, 11, 12:
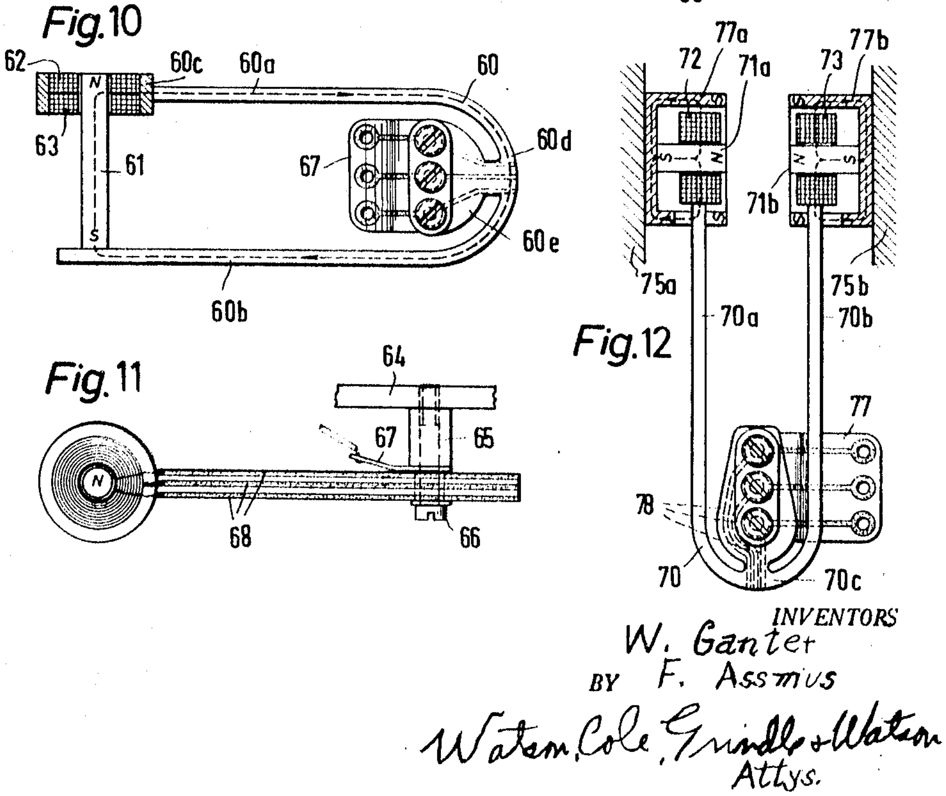

Further objects will be apparent from the following description when considered in connection with the accompanying drawings in which:

FIGURES 1 and 2 are side and top plan views respectively showing a first embodiment of the invention in which the tuning fork carries permanent magnets at its ends and serves as a part of a magnetic yoke, FIG. 3 is a top plan view of a further embodiment of the invention in which the ends of the tuning fork carry permanent magnets and appertaining yoke parts, FIG. 4 is a cross section taken on the line IV—IV of FIG. 3 in the direction of the arrows, FIG. 5 is a side elevation partly in section of a further embodiment of the invention in which a stationary yoke part is provided with a stationary coil arrangement into which the permanent magnets arranged on the ends of the tuning fork extend, and taken on line V—V of FIG. 6 in the direction of the arrows, FIG. 6 is an end view of the embodiment of FIG. 5, FIGS. 7 and 8 are side view and top elevation respectively showing a further embodiment of the invention in which the permanent magnet system is stationary and supports the stem part of the tuning fork, FIG. 9 is a side view showing a further embodiment of the invention in which two tuning forks are provided, whose stem parts are mutually connected through a permanent magnet, FIG. 10 is a plan view of a still further embodiment of the invention in which a tuning fork carries the coil system with one prong and the permanent magnet system with the other prong, FIG. 11 is a side view of the embodiment of FIG. 10, and FIG. 12 is a plan view of another embodiment of the invention with stationary permanent magnet arrangements and oscillating coil arrangements.

In FIGS. 1 and 2 numeral 10 is the overall designation for a tuning fork which is arranged in a plane parallel to a base plate 14 connected with this base plate by a stem portion 10*e* of said fork or a part 10*f* connected by a screw 16 with said stem by means of an intermediate piece 15 of ferromagnetic material. The tuning fork 10 with its prongs 10*a* and 10*b*, as well as the prong ends 10*c* and 10*d* having permanent magnets 11, are composed of permanently magnetic material, and the base plate 14 also consists of permanently magnetic material. The coil arrangement consists of two coils 12 and 13, which for example can be part of an electronic amplifier circuit. The path of the magnetic flux is indicated in FIG. 1 by means of a dash line. It is immediately evident that a largely closed magnetic circuit is maintained without the tuning fork arrangement having a large oscillating mass.

In FIGS. 3 and 4 the tuning fork is designated by 20, its stem part 20*e* is attached by means of a part 20*f* connected with the same and also an intermediate piece 25 and a screw 26 to a base plate 24. Prongs 20*a* and 20*b* of the tuning fork 20 carry end pieces 20*c* and 20*d* to which the permanent magnets 21*a* and 21*b* are attached with which the yoke parts 27*a* and 27*b* are immediately connected. These yoke parts surround the coil arrangement consisting of coils 22 and 23 and thus bring about a largely closed magnetic circuit.

The coil arrangement is provided on the base plate 24, which has two apertures 24*a* and 24*b*, through which the yoke parts 27*a* and 27*b* extend. In the case described, the base plate and the turning fork need not be composed of ferromagnetic material.

In FIGS. 5 and 6 a tuning fork is designated by reference character 30, which tuning fork bears at its ends permanent magnets 31*a* and 31*b* magnetized at right angles to the direction of oscillation of the tuning fork prongs. The tuning fork is attached by its stem by means of a spacer 35 and a screw 36, to a base plate 34, which base plate supports, in the area of the tuning fork ends, a box-like yoke part 37, in which coils 32 and 33 are arranged permanently on both sides of the permanent magnets 31*a* and 31*b*. In FIG. 6 the course of the magnetic flux is indicated by dash lines. A strong closed magnetic circuit is produced with small oscillating masses.

IN FIGS. 7 and 8 a tuning fork 40 is shown, whose prongs 40*a* and 40*b* are broadened at the ends 40*c* and 40*d* in the direction of the oscillations. They oscillate over the sides of a coil arrangement consisting of coils 42 and 43, permanently arranged on a base plate 44. The tuning fork 40 is fastened by its stem part 40*e* by means of a screw part 40*e* by means of a screw 46 with the interposition of a permanent magnet 41 to the base plate 44. The course of the magnetic flux is indicated in FIG. 7 by dash lines. A strong closed magnetic circuit is produced in FIGS. 7 and 8 with a very small oscillating mass.

FIG. 9 shows a further embodiment by which two tuning forks 50 and 57, as in FIGS. 7 and 8, are provided, which with their ends 50*a* and 57*a* oscillate over the coil arrangement consisting of coils 52 and 53. The coil arrangement 52 and 53 is arranged on a fixed support 55 and the stem parts of tuning forks 50 and 57 are connected with each other by means of a screw 56 and with the interposition of a permanent magnet 51 and fastened to a base plate 54. The course of the magnetic flux is indicated by a dash line.

FIGS. 10 and 11 show a further embodiment with a tuning fork 60 whose stem part 60*e* or a part 60*d* connected therewith is fastened, by means of a screw 66 with the interposition of a spacer 65, to a base plate 64. Prong 60*a* carries a holder 60*c* for the coil arrangement consisting of coils 62 and 63 into which the permanent bar magnet 61, attached to the second prong 60*b*, extends. The conductors 68 to the coils 62 and 63 run over the tuning fork prong 60*a* to the stem part 60*d* and from there to the connection plate 67.

FIG. 12 shows an embodiment in which a tuning fork 70 is provided, whose prongs 70*a* and 70*b* carry coils or coil arrangements 72 and 73. Here permanent magnet systems are provided, consisting of permanent magnets 71*a* and 71*b* and also the box-like yoke parts 77*a* and 77*b*, which are attached to the supports 75*a* and 75*b*. Tuning fork prongs 70*a* and 70*b* project with their ends carrying coils 72 and 73 into the yoke parts 77*a* and 77*b* and they are penetrated by the permanent magnets 71*a* and 71*b*. The conductors to coils 72 and 73 run over the prongs 70*a* and 70*b* to the stem part 70*c*, wherefrom the conductors 78 proceed to a terminal board or block 77.

We claim:

1. Tuning fork device maintained oscillating by electromagnetic means as a speed regulating oscillator for timekeeping instruments, comprising a permanent magnet arrangement with substantially closed magnetic path, and at least two coils, the magnet arrangement with its poles being capable of carrying out a relative motion against the coils, the coils consisting of a control coil and a drive coil arrangements 72 and 73. Here permanent magnet a permanent magnet at each end of each tine of the tuning fork prongs 70*a* and 70*b* project with their ends carrying stem being connected to the base plate, the tuning fork and the base plate being composed of ferromagnetic material and forming part of the magnetic circuit with the base plate supporting the coils.

References Cited

UNITED STATES PATENTS

| | | | |
|---|---|---|---|
| 2,707,234 | 4/1955 | Dostal | 84—1.04 |
| 3,162,006 | 12/1964 | Van Haaften | 58—23 |
| 2,015,410 | 9/1935 | Prescott | 310—25 |
| 2,950,447 | 8/1960 | McShan | 310—39 XR |
| 1,516,947 | 11/1924 | Beindorf | 84—457 |
| 3,171,991 | 3/1965 | Baumer | 310—21 |
| 2,628,343 | 2/1953 | Murray | 310—25 |
| 2,971,323 | 2/1961 | Hetzel | 58—23 |
| 1,717,094 | 6/1929 | Clokey | 310—25 XR |
| 3,269,249 | 8/1966 | Dailey | 310—25 XR |
| 3,085,168 | 4/1963 | Jones et al. | 310—25 |
| 1,637,442 | 8/1927 | Dorsey | 310—25 XR |
| 2,928,308 | 3/1960 | Godbey | 84—409 XR |
| 3,319,472 | 5/1967 | Reefman | 310—25 XR |

MILTON O. HIRSHFIELD, Primary Examiner

B. A. REYNOLDS, Assistant Examiner

U.S. Cl. X.R.

58—23; 84—409, 457; 310—21; 318—120